(12) United States Patent
Luce

(10) Patent No.: US 6,739,187 B2
(45) Date of Patent: May 25, 2004

(54) DEVICE FOR ARTICULATING A TIRE-PRESSURE SENSOR ON A MOTOR VEHICLE RIM

(75) Inventor: Dominique Luce, Toulouse (FR)

(73) Assignee: Siemens VDO Automotive, Toulouse Cedex (FR)

(*) Notice: Subject to any disclaimer, the term of this patent is extended or adjusted under 35 U.S.C. 154(b) by 0 days.

(21) Appl. No.: 10/397,341

(22) Filed: Mar. 27, 2003

(65) Prior Publication Data

US 2003/0192374 A1 Oct. 16, 2003

(30) Foreign Application Priority Data

Apr. 16, 2002 (FR) .......................................... 02 04730

(51) Int. Cl.[7] .............................................. B60C 23/02
(52) U.S. Cl. ..................................................... 73/146.8
(58) Field of Search ................................ 73/146, 146.2, 73/146.3, 146.4, 146.5, 146.8; 152/152.1; 116/30

(56) References Cited

U.S. PATENT DOCUMENTS 6,055,855 A  5/2000  Straub ........................ 73/146.8

FOREIGN PATENT DOCUMENTS

| DE | 196 10 376 A1 | 9/1997 |
|---|---|---|
| FR | 2 828 657 | 2/2003 |
| FR | 2 829 063 | 3/2003 |

*Primary Examiner*—William Oen
(74) *Attorney, Agent, or Firm*—Young & Thompson

(57) ABSTRACT

A device for articulating a tire-pressure sensor to a motor vehicle rim includes: a tire-inflation valve having a base designed to come into contact with a corresponding part of a tire-pressure sensor electronic unit, the valve having a threaded shank designed to be introduced through an orifice in a wheel rim and protrude outward therefrom, the valve base being situated in the continuation of the shank, and a tire-pressure electronic unit housing the valve base, and being pressed against the bottom of the rim by tightening a securing nut onto the threaded part of the shank of the valve. The valve base has a roughly spherical part collaborating with a region of corresponding shape formed on the electronic unit.

9 Claims, 1 Drawing Sheet

DEVICE FOR ARTICULATING A TIRE-PRESSURE SENSOR ON A MOTOR VEHICLE RIM

FIELD OF THE INVENTION

The present invention relates to a device for articulating a tire-pressure sensor on the rim of a motor vehicle. More specifically, this articulation is between a valve base and an electronic unit processing the signals delivered by the tire-pressure sensor.

BACKGROUND OF THE INVENTION

It is already known practice for a motor vehicle to be fitted with tire-pressure sensors. In general, each wheel of the vehicle has a pressure sensor placed on its rim inside the tire. These sensors are designed in particular to measure the pressure inside the tire and are, for this purpose, placed in an electronic unit also comprising means for processing the measured signal and for emitting this signal to a receiver placed inside the vehicle. If the pressure in one of the tires varies abnormally, a warning (an audible message, a visual message, etc.) alerts the driver to the detected anomaly. The driver is also informed of the position of the defective wheel. As these methods of processing the signal and of determining anomalies are known per se, they will not be detailed hereinafter.

It is already known practice for the tire-pressure sensor electronic unit to be fixed at the valve used for inflating the tires. Advantageously, by tightening a nut that secures this valve to the rim, the entire electronic unit can be fixed to the rim.

For this, the unit is designed to accommodate the valve base and to tilt toward the rim (so as to be pressed against the bottom of the rim) while the valve is being screwed onto the rim. Such an example of securing is described, for example, in patent applications FR 0110843 and FR 0111539 in the name of the Applicant Company.

The valve base is therefore articulated with respect to the electronic unit either through a set of two off-axis stops, or by the folding of a bellows. These solutions are satisfactory and allow the unit to be pressed against the bottom of the rim whatever the size of this rim (different radii of curvature). However, these solutions are relatively expensive to implement and involve a valve base equipped with extensions that are relatively difficult to produce.

SUMMARY OF THE INVENTION

The purpose of the present invention is to create an articulation between a valve base and a unit able to press the unit against the bottom of the rim regardless of the diameter of this rim. This articulation needs to remain simple to manufacture and inexpensive.

To this end, the present invention relates to a device for articulating a tire-pressure sensor to a motor vehicle rim, said device consisting of:
- a tire-inflation valve having a base designed to come into contact with a corresponding part of a tire-pressure sensor electronic unit, said valve further having a threaded shank designed to be introduced through an orifice in a wheel rim and to protrude outward from this rim, said valve base being situated in the continuation of the shank inside the rim, and
- a tire-pressure electronic unit housing the valve base, said unit being pressed against the bottom of the rim by tightening a securing nut onto the threaded part of the shank of the valve, said articulating device being characterized in that the valve base has a roughly spherical part collaborating with a region of corresponding shape formed on the electronic unit.

Advantageously, the valve base and the part of the unit in contact with this valve base are equipped with a plurality of facets. The collaboration between a facet belonging to the valve base and one of the facets belonging to the unit allows the angle of inclination between the valve and the unit to be set. As a result, the unit nestles perfectly (according to the radius of curvature of the rim) in the bottom of the rim.

Depending on the number of facets made on the valve base and on the unit, there are a certain number of possible angles of inclination between the valve and the unit. All that is required is to choose a suitable pair of facets (one on the valve base and one on the unit) in order to press the unit against the rim according to the radius of curvature of this rim.

As an alternative, the spherical part of the valve base is in direct contact with a spherical part of the unit. These two parts have no facets. They do, however, have means of slip-free clamping of one with respect to the other (studs and grooves for example). In this case, as the valve securing nut is tightened onto the shank, all that is required is for the unit to be pushed against the rim in order to adjust the angle of inclination of the unit with respect to the rim. The tilting of the unit in the bottom of the rim during tightening is therefore done by hand.

Advantageously, a reinforcing piece is placed between the unit and the rim so as to avoid any problem of these two elements hammering together.

BRIEF DESCRIPTION OF THE DRAWINGS

Other advantages, objects and features of the present invention will in any case become apparent from the description which follows, by way of nonlimiting example, with reference to the appended drawings in which.

DETAILED DESCRIPTION OF THE INVENTION

Figure 1:
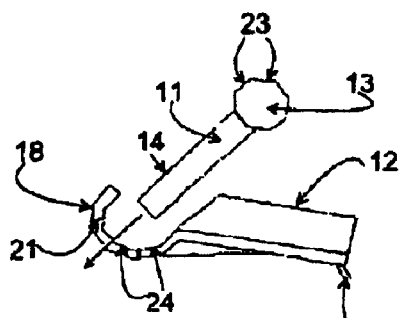
FIG. 1 is a diagrammatic view depicting a device according to a first embodiment of the invention, before it is fitted on the vehicle.

According to the embodiment illustrated in FIGS. 1 and 2, the articulating device 10 according to the present invention comprises:
- an inflation valve 11, and
- an electronic unit 12.

More specifically, the inflation valve 11 has a base 13 and a shank 14 threaded over part of its height, said shank being produced in the continuation of the base. A securing nut 15

(FIG. 2b) collaborates with the screw thread on the shank to hold the valve on a rim 16 (depicted schematically in section and in dotted line). As a preference, this valve is made of metal (for example of aluminum).

The electronic unit 12 is preferably made of plastic and has a housing 17 housing the necessary sensors (pressure sensors, temperature sensors, accelerometers, etc.) and electronic components (not depicted) for processing the signals measured by these sensors. This housing also comprises part of the means of emitting the measured data to a central unit generally situated inside the vehicle. As the processing of the measured data is entirely conventional, it will not be detailed here.

This electronic unit also comprises a cradle 18 designed to collaborate with the valve, as will be explained later on.

A flexible tab 19 is provided over the entire length of the unit. When the unit is in place at the bottom of the rim 16 (FIG. 2a or 2b), this flexible tab is in contact with the bottom of the rim and thus prevents vibrations from spreading between the rim and the unit.

Figure 2A:
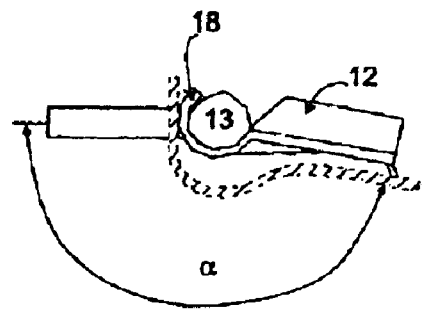
FIGS. 2a and 2b are schematic views similar to FIG. 1, showing a device according to the present invention, mounted on a wheel rim with an angle of tilt of 0° and of about 90°, respectively.
Figure 2B:
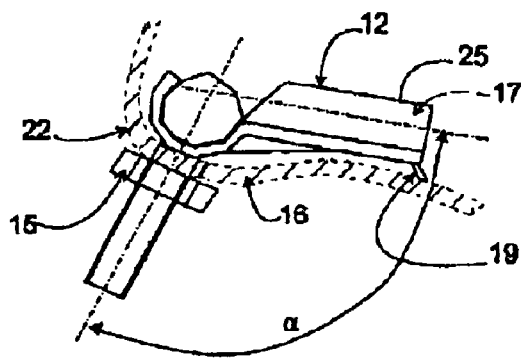
Figure 3:
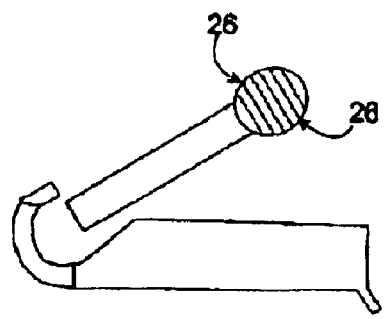
FIG. 3 is a schematic view depicting a device according to the invention according to a second embodiment of the invention.
Figure 4A:
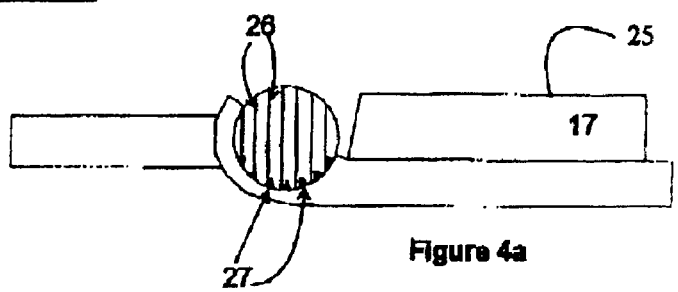
FIGS. 4a and 4b are schematic views similar to FIG. 3, showing a device according to the present invention mounted on a wheel rim with an angle of tilt of 0° and of about 90°, respectively.
Figure 4B:
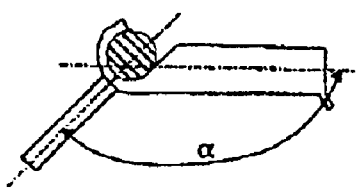
Figure 5:
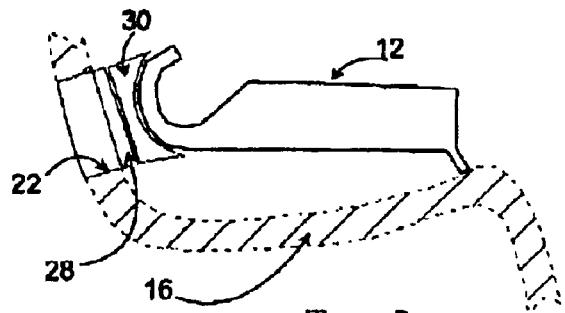
FIG. 5 is a schematic view showing a reinforcing piece according to the invention.

As can be seen better in FIGS. 2a and 2b, the shank 14 of the valve 12 is intended to pass through an aperture 21 made in the cradle 18, then through an orifice 22 made in the rim so as to protrude outward from the rim. The aperture 21 allows the valve shank to be positioned at 0 to 45° with respect to the unit. The valve base therefore collaborates with the unit cradle to press this unit against the rim 16. The securing nut 15 allows the entity consisting of the valve base and the cradle to be fixed on the rim 16 and locked in position.

Advantageously, according to a first embodiment, the valve base is a roughly spherical shape and is equipped with a first plurality of facets 23 which are intended to collaborate with a second plurality of facets 24 which are produced on the unit cradle (which is itself also of roughly spherical shape).

The facets formed on the valve base and on the unit cradle allow the angle α between the longitudinal axis of the valve and the longitudinal axis of the unit to be adjusted. Adjusting this angle makes it possible, whatever the curvature of the rim at the valve passage, for the electronic unit to be pressed against the bottom of the rim.

It will in fact be recalled that this unit has a weight of the order of a few tens of grams and is placed inside the vehicle tire. As the vehicle travels along, the rotation of the wheel (in which this unit is placed) subjects it to acceleration forces which may range as high as 2,000 G.

According to this first embodiment, the tilting of the unit toward the bottom of the rim is brought about automatically (in a predetermined way) by the angle of inclination between the valve base and the unit. It being possible for this angle to be chosen by the collaboration of one of the facets belonging to the base with one of the facets belonging to the unit cradle.

According to the facet chosen on the base and the one chosen on the unit it is possible to determine a specific angle and therefore to press the unit against the bottom of the rim whatever the curvature of the rim. There is a sufficiently high number of facets to allow a great many predetermined angles to be obtained. Nonetheless, this number is predetermined from the outset at the time of manufacture of the valve base and of the corresponding unit.

FIG. 2a illustrates, for example, an angle α of 180° and FIG. 2b illustrates the same device for which the angle α is about 90°.

Of course, the facets produced on the valve base and those produced accordingly on the unit may constitute regular or irregular polygons. In the case of irregular polygons, it is possible to obtain a greater number of angles α. Each of the facets (23) of the first plurality and of the second plurality (24) therefore has a different inclination.

It will also be noted that, in this embodiment, when, upon mounting, the facets belonging to the valve base and to the unit that are intended to collaborate are chosen, the angle α is automatically fixed.

It should be noted that only the lower part (in the drawings) of the valve base is called upon to collaborate with the electronic unit. As a result, the plurality of facets present on the valve base can be produced only on the lower part of the base. The upper part can therefore have any shape (truncated, spherical, or the like).

According to a second embodiment of the invention (FIGS. 3, 4a, 4b and 5), the angle α is not pre-determined. In this embodiment, the valve base is spherical (or spherical truncated at the upper part). This spherical base collaborates with a cradle of complementary shape, produced in the unit.

In this case, the valve base can pivot in the cradle throughout the tightening of the nut 15. More specifically, as this nut 15 is tightened, an operator pushes on the upper face 25 of the unit so as to press the latter into the bottom of the rim 16. The tilting and the securing of the unit in the bottom of the rim 16 is no longer automatic, but done by hand. Nonetheless, this pressing is made possible by virtue of the collaboration between the spherical surfaces of the valve base and of the unit cradle.

To make it easier to secure and immobilize (provide slip-free clamping of) the valve with respect to the unit, the valve base may be equipped with a plurality of grooves 26 collaborating with a plurality of studs 27 which are formed on the electronic unit cradle.

This second embodiment has the advantage that it tailors itself to suit the precise radius of curvature of the rim, whatever this radius of curvature. As a result, one same device according to the invention can be fitted on different rims and thus equip different vehicles without that complicating its manufacture.

Whatever the embodiment used, it is possible for a reinforcing piece 30, preferably made of metal, to be inserted between the unit and the rim. A first face of this piece closely hugging the external profile of the unit cradle and a second face being designed to collaborate with the rim and a seal (not depicted) placed at the orifice 22 through which the valve passes through the rim.

The purpose of this reinforcing piece 30 is to avoid any hammering action of the materials of the unit and of the region on which it bears on the rim (or a seal possibly protected by a washer 28).

Of course, the present invention is not limited to the embodiments described hereinabove and encompasses any alternative form that falls within the competence of the person skilled in the art. Thus, the grooves 26 could just as easily be made on the unit and the studs 27 on the valve base. Likewise, the angle α can vary between 0° and 270° depending on the various curvatures of rims on which the device according to the invention is to be fitted.

What is claimed is:

1. A device (10) for articulating a tire-pressure sensor to a motor vehicle rim (16), said device consisting of:
   a tire-inflation valve (11) having a base (13) and designed to come into contact with a corresponding part (18) of a tire-pressure sensor electronic unit (12), said valve further having a threaded shank (14) designed to be introduced through an orifice (22) in a wheel rim and to protrude outward from this rim, said valve base being situated in the continuation of the shank, and a tire-pressure electronic unit (12) housing the valve base, said unit being pressed against the bottom of the rim (16) by tightening a securing nut (15) onto the threaded part of the shank of the valve, said articulating device being characterized in that the valve base has a roughly spherical part collaborating with a region of corresponding shape formed on the electronic unit.

2. The device as claimed in claim 1, characterized in that the roughly spherical part comprises a first plurality of facets (23) which are designed to collaborate with a second plurality of facets (24) which are formed on the corresponding part of the unit.

3. The device as claimed in claim 2, characterized in that an angle (α) of tilting of the unit with respect to the valve is determined by the pair of facets in contact when the securing nut (15) is tightened onto the shank (14) of the valve.

4. The device claimed in claim 2, characterized in that each of the facets (23) of the first plurality and of the second plurality (24) has a different inclination.

5. The device as claimed in claim 1, characterized in that the roughly spherical part of the valve base has a plurality of grooves (26) designed to collaborate with studs (27) that are formed on the corresponding part of the unit, so as to provide slip-free clamping of the valve base in the corresponding part of the unit, at a predetermined angle of inclination.

6. The device as claimed in claim 1, characterized in that the roughly spherical part of the valve base has studs (27) designed to collaborate with a plurality of grooves (26) that is formed on the corresponding part of the unit, so as to provide slip-free clamping of the valve base in the corresponding part of the unit, at a predetermined angle of inclination.

7. The device as claimed in claim 1, characterized in that a reinforcing piece (30) of a shape corresponding to the external profile of the unit, is inserted between the unit (12) and the rim (16) so as to avoid any hammering between the unit and the region in which it bears against the rim.

8. The device as claimed in claim 7, characterized in that the valve base and the reinforcing piece are made of metal and the unit is made of plastic.

9. The device as claimed in claim 3, characterized in that each of the facets (23) of the first plurality and of the second plurality (24) has a different inclination.

* * * * *